(12) United States Patent
Bouvier et al.

(10) Patent No.: US 8,932,386 B2
(45) Date of Patent: Jan. 13, 2015

(54) ZEOLITE ADSORBENT HAVING AN ORGANIC BINDER

(75) Inventors: Ludivine Bouvier, Orthez (FR); Serge Nicolas, Lons (FR); Alice Medevielle, Pau (FR); Patrick Alex, Limours Pecqueuse (FR)

(73) Assignee: CECA S.A., La Garenne Colombes (FR)

( * ) Notice: Subject to any disclaimer, the term of this patent is extended or adjusted under 35 U.S.C. 154(b) by 0 days.

(21) Appl. No.: 13/130,057

(22) PCT Filed: Dec. 3, 2009

(86) PCT No.: PCT/FR2009/052406
§ 371 (c)(1),
(2), (4) Date: Jun. 22, 2011

(87) PCT Pub. No.: WO2010/063975
PCT Pub. Date: Jun. 10, 2010

(65) Prior Publication Data
US 2011/0259828 A1    Oct. 27, 2011

(30) Foreign Application Priority Data
Dec. 5, 2008    (FR) ..................................... 08 58293

(51) Int. Cl.
*B01D 53/02*    (2006.01)
*B01J 20/28*    (2006.01)
*B01J 20/18*    (2006.01)

(52) U.S. Cl.
CPC .......... *B01J 20/183* (2013.01); *B01J 20/28095* (2013.01); *B01D 2253/108* (2013.01); *B01D 53/02* (2013.01); *B01J 20/28004* (2013.01); *B01D 2253/304* (2013.01); *B01J 20/2803* (2013.01); *B01J 20/28026* (2013.01); *B01J 20/28042* (2013.01)
USPC ........ 96/108; 95/90; 95/117; 95/130; 95/139; 210/660; 501/1; 501/62

(58) Field of Classification Search
CPC ................. B01D 2253/108; B01D 2253/1085; B01D 2253/25; B01J 20/18; B01J 20/183; B01J 20/28026; B01J 20/2803
USPC ............. 210/660; 502/1, 62; 95/90, 117, 130, 95/139; 96/108
See application file for complete search history.

(56) References Cited

U.S. PATENT DOCUMENTS

| | | | | |
|---|---|---|---|---|
| 4,013,566 A | * | 3/1977 | Taylor | 502/62 |
| 5,432,214 A | * | 7/1995 | Lancesseur | 524/12 |

(Continued)

FOREIGN PATENT DOCUMENTS

| | | | |
|---|---|---|---|
| EP | 1323468 | 7/2003 | |
| WO | 20061069781 | 6/2006 | |
| WO | WO 2006069781 A2 * | 7/2006 | ............. B01D 53/02 |

OTHER PUBLICATIONS

International Search Report received in PCT/FR2009/052406 mailed Apr. 7, 2010.

*Primary Examiner* — Christopher P Jones
(74) *Attorney, Agent, or Firm* — Smith, Gambrell & Russell, LLP

(57) ABSTRACT

The present invention relates to an agglomerated zeolite adsorbent containing at least one polymer matrix that is greatly laden with at least one zeolite adsorbent. The invention also relates to the method for preparing such an adsorbent and to the uses thereof, particularly as an adsorbent of moisture, odors, volatile organic components, and the like.

14 Claims, 4 Drawing Sheets

(56) References Cited

U.S. PATENT DOCUMENTS

| | | |
|---|---|---|
| 5,935,891 A | 8/1999 | Pryor |
| 6,602,444 B1 | 8/2003 | Spinks |
| 2005/0100744 A1 | 5/2005 | Spinks |
| 2005/0124758 A1* | 6/2005 | Dick et al. ............ 524/779 |
| 2006/0105158 A1 | 5/2006 | Fritz |
| 2008/0202336 A1* | 8/2008 | Hofer et al. ............ 95/90 |

* cited by examiner

ZEOLITE ADSORBENT HAVING AN ORGANIC BINDER

The present invention relates to an agglomerated zeolitic adsorbent comprising at least one polymer matrix highly charged with at least one adsorbent of zeolite type. The invention also relates to the process of the preparation of such an adsorbent, obtained in particular by extrusion, and to its uses, in particular as adsorbent of moisture, of odors, of volatile organic compounds, and the like.

The zeolitic adsorbents commonly used today are adsorbents comprising one or more zeolites agglomerated using an inorganic binder. These agglomerates are provided in various forms, generally in the form of beads, extrudates, powders and the like, with more or less large particles sizes, generally from a few micrometers to a few millimeters.

These agglomerated adsorbents are then used as is, for example for filling columns for the purification or separation of liquids or gases, or also for supporting catalysts employed in chemical reactions.

However, such agglomerates exhibit the disadvantage of generating dust, fines or fumes and require precautions when used, in particular a container which makes it possible to confine said agglomerates in order to be able to use them.

In order to be able to overcome the problems related to the handling of zeolitic powders and agglomerates and to be able to have available shaped solid zeolitic adsorbents (not requiring a container in order to be handled), the proposal has been made to insert zeolite powders and/or zeolitic agglomerates into a polymer matrix. Said polymer matrix can then be shaped by molding, injection molding, extrusion and the like.

Such shaped articles can be more easily handled than zeolite powders or zeolitic powder agglomerates and are thus more easily used as adsorbent in the form of granules, films, bars, including small bars, rods and the like.

However, the zeolitic adsorbents comprising a polymer matrix (i.e., comprising an organic binder) that have been provided to date suffer from numerous disadvantages, the main one being the low content of zeolite which can be incorporated in the polymer matrix.

This is because the state of the art shows that it is relatively difficult to achieve high contents of zeolite in a polymer matrix by blending zeolite powder in a polymer matrix in the molten state.

In addition, the mechanical properties of the articles obtained by extrusion, extrusion-molding or molding of zeolitic adsorbents comprising a polymer matrix greatly decline when the content by weight of zeolite powder increases in said polymer matrix.

The result is that, to date, zeolitic adsorbents comprising an organic binder are friable, brittle and/or have only low adsorption capacities.

In order to overcome these disadvantages, preparations formed of compositions of zeolite powder and polymer, in the presence of pore-forming agents and/or processing aids, have been proposed.

This solution exhibits the disadvantage of reducing the level of zeolite for the same volume of zeolitic adsorbent comprising an organic matrix. Nevertheless, these pore-forming agents and processing aids create macro-/mesoporosity in the organic matrix, which results in rapid adsorption kinetics and hence in a very short duration of effectiveness.

A need thus remains for zeolitic adsorbents comprising an organic binder of maximum adsorption capacity, with slow adsorption kinetics, which have good mechanical properties. This need is particularly important for zeolitic adsorbent materials provided in the form of solids (or monoliths) which can be obtained by extrusion, molding, extrusion-molding, injection, injection molding and the like.

Such zeolitic adsorbents comprising an organic binder form a first objective of the present invention. Yet other objectives will become apparent in the course of the description of the invention which follows.

Thus, the present invention relates first of all to a zeolitic adsorbent material comprising an organic binder, comprising:
a) a polymer matrix, and
b) at least one zeolite,
and in which:
 the zeolite crystals are homogeneously distributed in said matrix, and
 the amount of zeolite crystals is greater than 65% by weight, preferably greater than 70% by weight, with respect to the total weight of said adsorbent material, and less than 99% by weight, preferably less than 95% by weight, more preferably less than 90% and entirely preferably less than or equal to 85% by weight, with respect to the total weight of said adsorbent material.

Within the meaning of the invention, the zeolitic adsorbent material is generally obtained from a compound (blend), followed by shaping, for example by extrusion, molding, extrusion-molding, extrusion-injection molding or any other technique known to a person skilled in the art which makes it possible to obtain an article in the solid form starting from at least one molten polymer matrix.

The polymer matrix included in the adsorbent material according to the present invention can be of any type known per se to a person skilled in the art who is an expert in polymers. This polymer matrix preferably comprises an amount by weight, with respect to the total weight of the polymer matrix, of greater than 20%, preferably of greater than 50%, of at least one thermoplastic and/or thermosetting homopolymer and/or copolymer.

Preferably, the polymer matrix comprises at least one thermoplastic homopolymer and/or copolymer and more preferably is composed of at least one thermoplastic homopolymer and/or copolymer.

By way of example and without implied limitation, the polymer matrix comprises a polyolefin, for example of polyethylene or polypropylene type, and the like; elastomers, such as those of acrylates copolymer type, for example ethylene/butyl acrylate copolymer type; a polyamide; a polyester or also a blend of two or more of these polymers.

The polymer matrix can also comprise, in all or in part, one or more polymers, homo- and/or copolymers, capable of forming a supramolecular assembly. The teem "supramolecular assembly" is intended to mean polymers, homo- and/or copolymers, capable of associating with one another by means of hydrogen bonds.

Mention may be made, among "supramolecular" polymers, as nonlimiting examples, of semicrystalline polymers and in particular those formed by supramolecular assembling of compounds resulting from the condensation of a fatty acid and/or of a fatty acid dimer and/or of a fatty acid trimer and of at least one associative amine (capable of forming hydrogen bonds) chosen from 1-(2-aminoethyl)imidazolidin-2-one (UDETA), 1-(2-[(2-aminoethyl)amino]ethyl)imidazolidone (UDETA), 1-(2-{2-[(2-aminoethyl)amino]ethylamino}ethyl)-imidazolidone (UTEPA), N-(6-aminohexyl)-N'-(6-methyl-4-oxo-1,4-dihydropyrimidin-2-yl)urea (UPy), and their mixtures.

The zeolite included in the agglomerated material according to the present invention can be of any type known per se, natural, synthetic or artificial, preferably in the crystalline form, the mean particle size of which is less than 20 μm, preferably less than 15 μm, and is greater than 0.05 μm, preferably greater than 0.1 μm. The mean particle size is measured by laser diffraction. In the examples of the invention, this particle size is measured using a Malvern® Instrument Mastersizer S device, standard NF ISO 13320 (2000).

Mention may be made, as nonlimiting examples of zeolites which can be employed in the present invention, of zeolites A, faujasites X, faujasites LSX, faujasites Y and the like. It is clearly understood that use may be made of a mixture of two or more zeolites. This is particularly advantageous when it is desired to adjust the adsorption capacity and/or the adsorption kinetics of the material according to the present invention, the various types of zeolites each having specific adsorption capacities and kinetics.

According to another aspect of the present invention, the adsorbent material according to the present invention can additionally comprise one or more additives commonly used in compounding techniques. Nonlimiting examples of such additives can be chosen from UST stabilizers, pigments, dyes, antioxidants, impact modifiers, phase changing materials (PCMB), flame retardants, odorous agents and the like.

According to one aspect of the invention, the adsorbent material according to the invention can comprise one or more compounds capable of changing color (colored indicator) according to the degree of adsorption of the zeolite. Such compounds are, for example, pigments, inks or dyes which react chemically while changing color. Examples of reactive inks are, for example, described in the application WO 2006/079713.

It has been discovered, surprisingly, that it is possible to prepare a zeolitic adsorbent material comprising an organic matrix in which at least one zeolite having the abovementioned characteristics is incorporated.

More specifically, for the preparation of the agglomerated material comprising an organic matrix, the plastics are compounded in the molten state with the zeolite(s) using a device known to a person skilled in the art; mention may be made, by way of example, of internal mixers (e.g., Banbury type), roll mills, single-screw or counterrotating or corotating twin-screw extruders, or continuous cokneaders (e.g., Buss type). The compounding device can be one of the devices mentioned above or a combination, such as, for example, a cokneader in combination with a take-up single-screw, a corotating twin-screw in combination with a gear pump, and the like.

The compounding device is configured so as to identify a zone of melting of the polymer, a zone of blending and/or a zone of pressure reduction/venting to remove the volatile compounds. These different zones can be given material form by the configuration of the screw of the device, the use of a restriction zone or the coupling together of devices.

The device can also be equipped with a filtration system, preferably a continuous filtration system, so as to remove the undispersed agglomerates. Finally, the device is equipped with a rod granulation system, with cooling under air or under water, suited to the rheology of the compound by its geometry and its thermal characteristics.

The polymer matrix and the zeolite(s), and the optional additives, can be introduced simultaneously or separately. In particular, the zeolite(s) can be introduced, in all or in part, either in the main hopper with the solid polymer matrix or into the molten polymer matrix, using a feeding device.

The crystals of zeolite(s) are distributed homogeneously in the adsorbent material, that is to say without a zeolite concentration gradient in the adsorbent material.

The adsorbent material thus obtained exhibits a single porosity which is the intrinsic porosity of the zeolite, in contrast to the known adsorbent materials of the prior art.

Entirely surprisingly, it is observed that the adsorbent materials according to the invention, despite their very high level of zeolite, retain polymeric properties and are nonfriable.

In addition, the adsorbent materials according to the invention exhibit very slow adsorption kinetics, as shown in the examples illustrating the invention which are presented below.

Specifically, the zeolitic-adsorbent materials comprising an organic matrix of the prior art exhibit relatively rapid adsorption kinetics, which can be explained by the fact that the zeolitic adsorbents of the prior art include microchannels and can thus be characterized by a "double porosity", i.e. a "microporosity" (due to the zeolites) and a "macroporosity" (due to the microchannels). This results in durations varying from a few hours to a few days to completely or virtually completely saturate said adsorbents of the prior art.

In contrast to the zeolitic adsorbents of the prior art, the zeolitic adsorbents comprising an organic binder of the invention exhibit just one type of porosity which is a microporosity, making possible controlled adsorption kinetics which are more or less rapid and a long-lasting action (a few months up to a year, for example).

In addition, the kinetics can advantageously be adjusted by incorporation, into the polymer matrix, of a mixture of two or more zeolites with different porosities but also by the nature of the organic binder(s) (polymer matrix(ces)). It should be understood that the nature of the zeolite(s)/polymer matrix (ces) makes it possible to control the nature of the molecules adsorbed and also the adsorption kinetics.

Thus, a person skilled in the art who is an expert in adsorption on zeolites can choose the nature of the zeolite(s) which has(have) to be incorporated in the polymer matrix as a function of the nature of the molecules to be adsorbed (water, odorous organic molecules, contaminants, and the like).

Likewise, the nature of the polymer matrix makes it possible to adjust the adsorption kinetics. In particular, an adjustment in the crystallinity of the polymer(s) forming the polymer matrix (for example polyethers of various crystallinities) makes it possible to adjust the adsorption kinetics. Yet other possibilities of adjusting the adsorption kinetics would be easily accessible to a person skilled in the art by making modifications to the polymer matrix, for example by introducing amorphous blocks (such as EVA or EBA), hydrophilic blocks (e.g., polyether polyols or polyester polyols), and the like.

Furthermore, the high level of loading of the zeolitic adsorbents of the invention is reflected by a high adsorption capacity by volume.

Yet another advantage related to the zeolitic adsorbents according to the present invention is characterized in that the materials exhibit an excellent dimensional stability, even and in particular at the maximum adsorption capacity.

This entirely unexpected characteristic makes it possible to envisage the preparation of extruded, molded and other articles, the dimensions of which are exactly retained, without undergoing deformations, over time, whatever the amount of adsorbed molecules, in particular water. This is particularly advantageous for extruded, molded and other articles used in the manufacture of construction materials (profiled elements, frames for windows and doors, and the like) or assembly parts (lids of boxes, containers, and the like).

Thus, the dimensions of the adsorbent materials according to the invention are retained and the articles comprising said adsorbent materials do not undergo deformation. However, modifications in dimensions and/or in shapes may be observed but, in this case, only due to the intrinsic properties of the matrix, which may be susceptible to "swelling" naturally.

Another advantageous aspect of the zeolitic adsorbents of the present invention is the possible regeneration of said adsorbents. This is because, as the adsorption is a reversible phenomenon, the zeolitic adsorbent comprising an organic binder of the invention may or may not be subjected to degassing, before or after use, for example after use, and thus be regenerated, for example the desorption, drying or other techniques known to a person skilled in the art, provided that the polymer matrix is not decomposed.

The properties and advantages of the zeolitic adsorbents comprising an organic binder of the invention as just described make it possible to have available extruded, molded, injection molded and other adsorbent articles which find use in a great many fields of application.

This is because such adsorbents/articles have very good adsorption properties but also very good release properties. Due to their very high level of loading with zeolite(s), the adsorbents of the invention make possible the adsorption (and/or the release) of compounds of any type, just like the zeolitic agglomerates comprising an inorganic binder that are known from the prior art. Thus, the compounds which can be adsorbed and/or released are, as nonlimiting examples, liquids, gases and the like, in particular water, oxygen, carbon dioxide gas, nitrogen, volatile organic compounds (VOCs), monomers, odorous molecules, contaminants, and the like.

The fields of application, i.e. of use, of the zeolitic adsorbents comprising an organic binder according to the present invention are consequently many and varied. The adsorbents of the invention can, for example, advantageously be used as moisture-adsorbing components, gas-separating components, in particular in processes for the production of oxygen, liquid-separating components and the like.

The zeolitic adsorbents comprising an organic binder of the present invention are particularly suitable for use as moisture-adsorbing components (dehydrating components) which can be inserted into windows (double glazing), electrical and electronic housings, packagings (photos, pharmacie, freeze-dried products and the like) and more generally into any type of fixed housed part, advantageously replacing the desiccant bags known from the prior art.

Depending on the nature of the organic binder of the adsorbents of the invention, the adsorbents may also be entirely suitable for use in the food and food processing fields.

Figure 1:
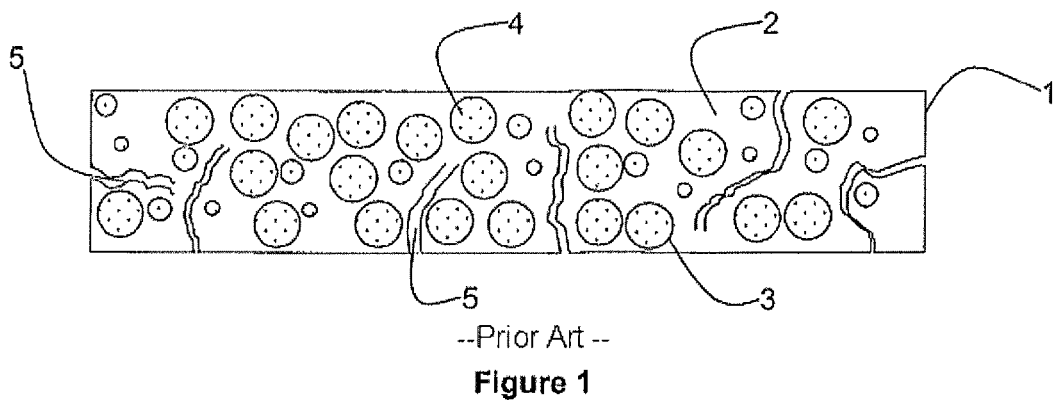
FIG. 1 represents a zeolitic adsorbent (1) comprising an organic binder (2) according to the prior art, comprising two types of porosity: a microporosity, represented diagrammatically by the zeolite in the powder form (4) included within agglomerates (3) comprising an inorganic binder, and a macro- or mesoporosity, represented diagrammatically by the microchannels (5).
Figure 2:
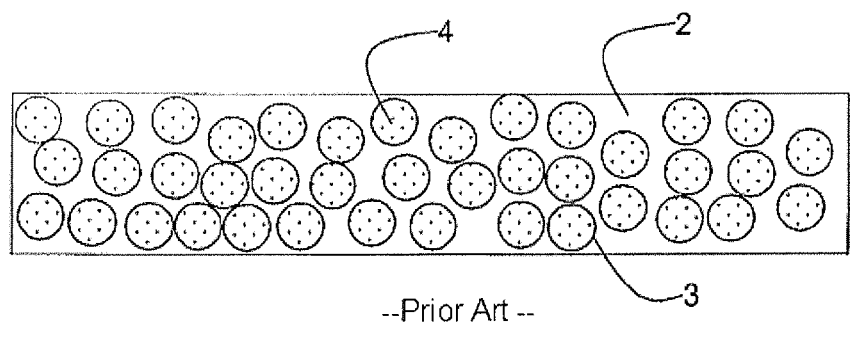
FIG. 2 represents a zeolitic adsorbent (1) comprising an organic binder (2) according to the prior art, comprising agglomerates (3) comprising an organic binder of zeolite in the powder form (4).
Figure 3:
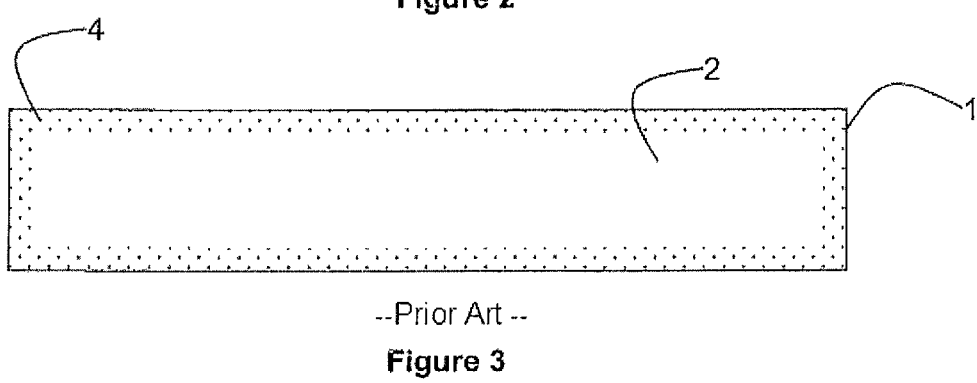
FIG. 3 represents a zeolitic adsorbent (1) comprising an organic binder (2) according to the prior art, in which the distribution of the zeolite (4) is not homogeneous throughout the adsorbent.
Figure 4:
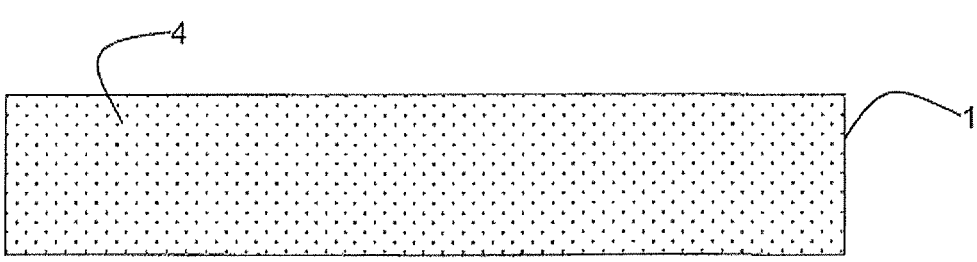
FIG. 4 represents a zeolitic adsorbent (1) comprising an organic binder (2) according to the invention, in which the zeolite powder (4) is distributed homogeneously throughout the adsorbent.

The present invention is now illustrated using the following examples, which are not intended to limit the scope thereof, the scope being defined by the appended claims, read and interpreted in the light of the above description.

Unless otherwise indicated, the percentages are expressed by weight.

EXAMPLE 1

Adsorbent Material Based on Ethylene/Butyl Acrylate Copolymer and on Zeolite 3A

Two types of ethylene/butyl acrylate (EBA) copolymers were studied:
Lotryl® 17 BA 07 (ethylene/butyl acrylate (17%) copolymer; Arkema);
Lotryl® 30 BA 07 (ethylene/butyl acrylate (30%) copolymer; Arkema).

The zeolite used is a powder formed of zeolite of type 3A: Siliporite® NK30 AP, sold by CECA. The antioxidant used in Tests 3 and 4 is Irganox® 1010 (CIBA).

The compounding is carried out on a Buss® continuous cokneader of PR46/70 type. The granulation is carried out in a face cutter under a water spray (under air for example E).

The set temperature values (barrels and screws) on the kneader and the take-up extruder are regulated between 150° C. and 185° C., as a function of the compositions, so as to granulate the product at approximately 180° C. (temperature of the melt in a die). The cooling of the extruded rod is a cooling under water or under air.

The products are fed simultaneously with:
a polymer/Irganox® 1010 premix (total dispensing 3 kg/h) and
the zeolitic adsorbent: Siliporite® NK 30 AP (dispensing 7 kg/h).

The granules obtained are introduced into a single-screw extruder with a diameter of 45, in order to form an extruded rod of rectangular cross section with the dimensions: length 60 mm, width 12 mm, thickness 7.5 mm, with an extrusion temperature of 230-240° C. and an extrusion rate of 10 kg/h. These rods are cooled under water.

The compositions of the blends studied are collated in table 1 below. The percentages are percentages by weight, with respect to the total weight.

TABLE 1

|  | Test 1 | Test 2 | Test 3 | Test 4 |
| --- | --- | --- | --- | --- |
| Lotryl ® 17 BA 07 | 30% | — | 29.9% | — |
| Lotryl ® 30 BA 07 | — | 30% | — | 29.9% |
| Siliporite ® NK30 AP | 70% | 70% | 70% | 70% |
| Irganox ® 1010 | — | — | 0.1% | 0.1% |

EXAMPLE 2

Adsorbent Material Based on Polymers and on Zeolite 3A (Siliporite® NK30 AP)

Extruded rods are prepared with different types of polymers, according to the extrusion conditions described in example 1 but with an extrusion temperature of 200-250° C., in the presence of an antioxidant, as described in table 2 below.

TABLE 2

|  | Test A | Test B | Test C | Test D | Test E |
|---|---|---|---|---|---|
| Lotryl ® 17 BA 07 | 24.9% | 29.9% | 19.9% |  |  |
| Lacqtene ® 1200MN18 |  |  | 10% |  |  |
| PPH ® 11012 |  |  |  | 29.9% | 29.9% |
| Siliporite ® NK30 AP | 75% | 70% | 70% | 70% | 70% |
| Irganox ® 1010 | 0.1% | 0.1% | 0.1% | 0.1% | 0.1% |
| Cooling | under water | under water | under water | under water | under air |

Lacqtene ® 1200MN18: low density polyethylene (Arkema)
PPH ® 11012: polypropylene (Total)

EXAMPLE 3

Characterization of the Extruded Products

A level of ash is produced by direct calcination at 1000° C. for 30 minutes, as described in the standard NF ISO 3451-1 (1997), for each of the preceding examples. The following results are obtained (table 3):

TABLE 3

| Test | Level of ash (%) |
|---|---|
| 1 | 70 |
| 2 | 70 |
| 3 | 70 |
| 4 | 70 |
| A | 74 |
| B | 70 |
| C | 70 |
| D | 70 |
| E | 70 |

EXAMPLE 4

Moisture Adsorption Test

The moisture adsorption tests on the extruded rods of example 1 (Tests 1 to 4) are carried out in a closed chamber at a humidity level controlled at 50% and at ambient temperature, in order to evaluate the effect of the type of polymer and of the use of the antioxidant.

Figure 5:
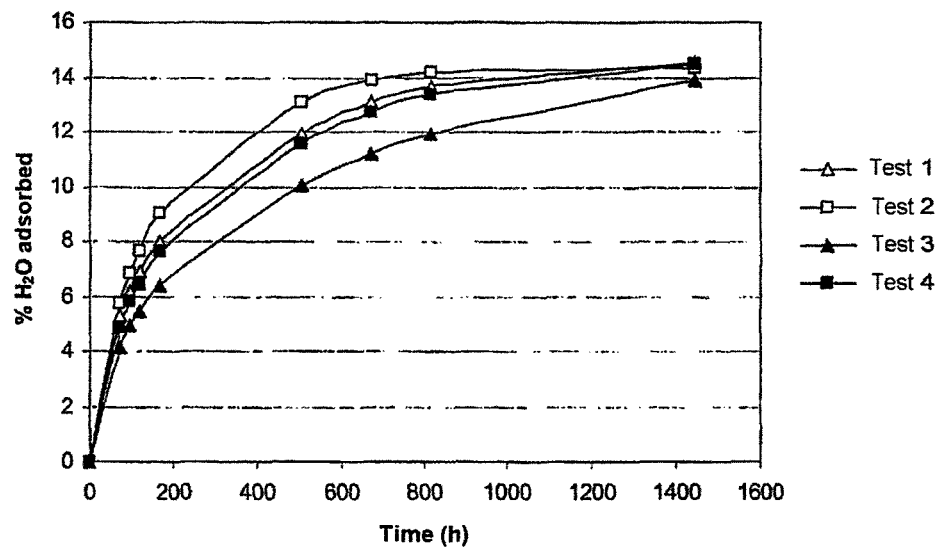
FIG. 5 is a graphical representation of the adsorption results with regard to extruded products.

The water adsorption results as a function of the tests are presented in the graph in FIG. 5. It is noticed that the moisture adsorption maximum is reached only after approximately 1400 hours.

Furthermore, it is observed that the introduction of a greater amount of polar monomer increases the adsorption kinetics of the extruded rod.

EXAMPLE 5

Adsorption Capacity and Dimensional Stability

The extruded rods are immersed in water at ambient temperature.

The maximum adsorption capacity is reached after approximately 4000 hours and is approximately 18%.

It is found that the dimensions of the extruded rods have remained identical, attesting to the dimensional stability of the adsorbents of the invention during and after use.

EXAMPLE 6

Moisture Adsorption Test

Rods are produced as indicated in the preceding examples, along with grains, sheets and small bars, obtained in a similar way or by injection molding or by compression, according to the methods known to a person skilled in the art.

The moisture adsorption tests are carried out in a closed chamber at a humidity level controlled at 32% according to the standard NF 1279-2 (insulation glazing) on extruded granules (with dimensions of approximately 3 mm in diameter and from 3 to 5 mm in length) and on the extruded rods obtained in the preceding examples.

Figure 6:
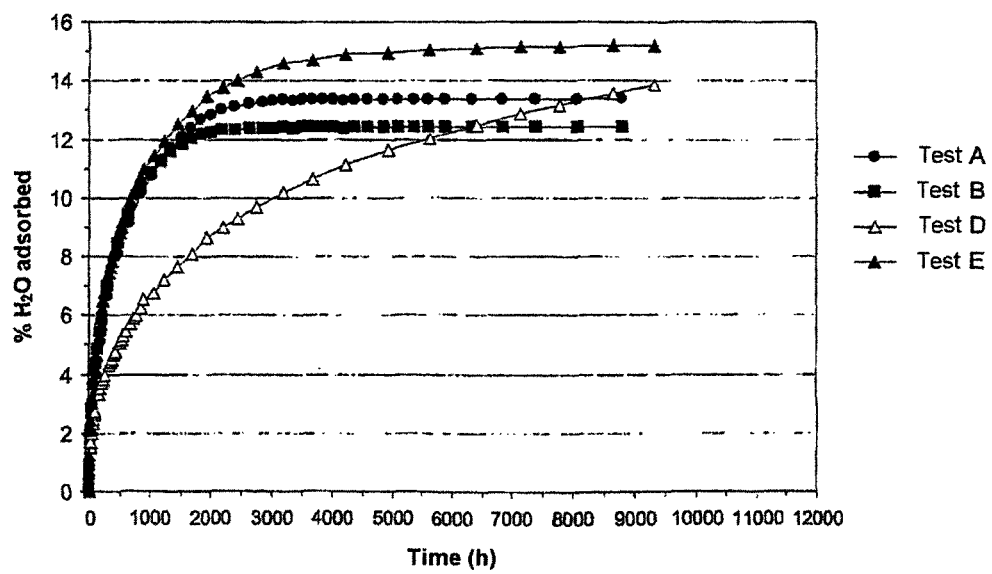
FIG. 6 is a graphical representation of the adsorption results with regard to grains.

The adsorption results with regard to grains are presented on the graph in FIG. 6.

It is noticed that, for the materials prepared with cooling under water, the adsorption kinetics of polypropylene-based materials are slower than with materials based on EBA copolymers. In addition, it is observed that the cooling under air makes it possible to accelerate the adsorption kinetics and that it is possible to adjust the kinetics with the amount of zeolite powder.

Figure 7:
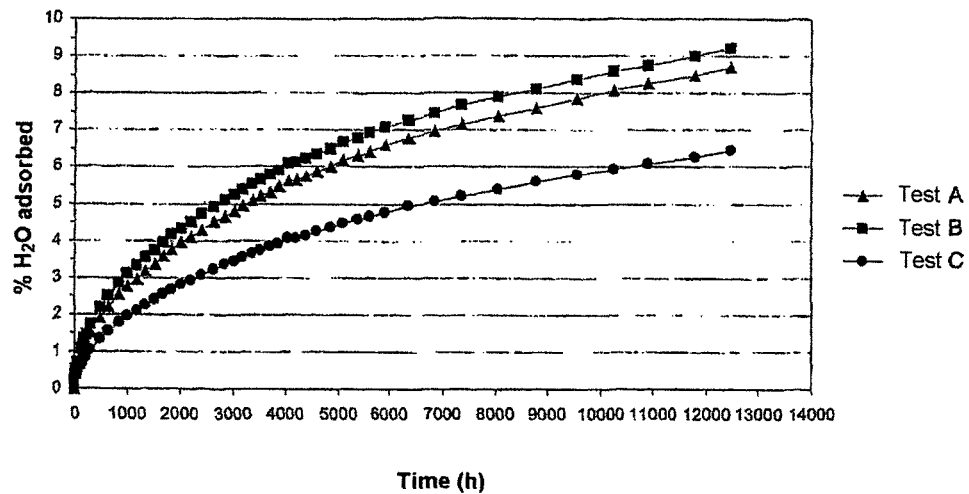
FIG. 7 is a graphical representation of the adsorption results with regard to rods.

The adsorption results with regard to rods are presented on the graph in FIG. 7.

It is found that the adsorption with regard to grains is faster than with regard to rods: it is thus possible to adjust the kinetics as a function of the shape of the objects. It is also found that the more hydrophobic the polymer, the slower the adsorption kinetics.

EXAMPLE 7

Preparation of Adsorbents with Different Types of Zeolites

Adsorbents based on low density polyethylene/zeolite NK10 and G5XP (CECA) are produced by extrusion on the Buss device, with the following operating conditions:
Compounding temperature: 160-180° C.;
Speed of the kneading screw: 240 revolutions/minute;
Speed of the conveying screw: 13 revolutions/minute;
Throughput of the machine: 10 kg/h;
Application of venting to the conveying screw;
Cooling under water;
Size and shape of the granules (as in example 6).

The granules obtained are subsequently converted by compression to produce sheets (10 cm×10 cm×200 μm). The compositions of tests F and G are as follows:

|  | Test F | Test G |
|---|---|---|
| Lacqtene ® 1200MN18 (Arkema) | 29.9 | 29.9 |
| Siliporite ® NK10AP (CECA) | 70 | — |

|  | Test F | Test G |
| --- | --- | --- |
| Siliporite ® G5XP (CECA) | — | 70 |
| Irganox ® 1010 (CIBA) | 0.1% | 0.1% |

EXAMPLE 8

Moisture Adsorption Test

Figure 8:
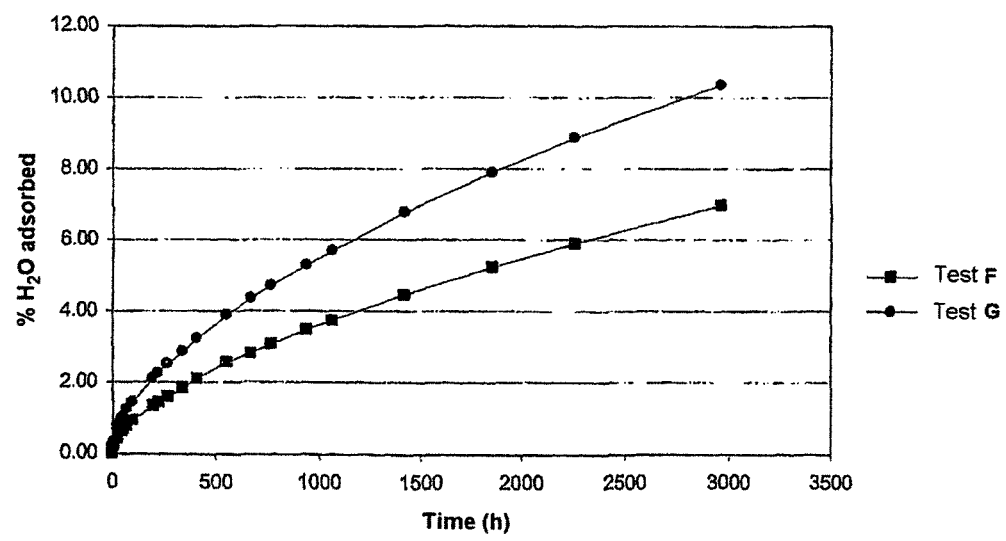
FIG. 8 is a graphical representation of the adsorption results with regard to sheets.

Moisture adsorption tests are carried out on the sheets obtained in the preceding example (tests F and G) according to the operating conditions described in example 6. The results are presented on the graph in FIG. 8.

These results show that the use of a zeolite with a greater adsorption capacity makes it possible to obtain faster adsorption kinetics.

EXAMPLE 9

Adsorption Tests for Molecules of VOC Type

Adsorption tests for toluene (test H) are carried out on a sheet identical to that used in test G, in a closed chamber at a toluene partial pressure controlled at 50% and at ambient temperature, in order to evaluate the adsorption of larger molecules of VOC type.

Figure 9:
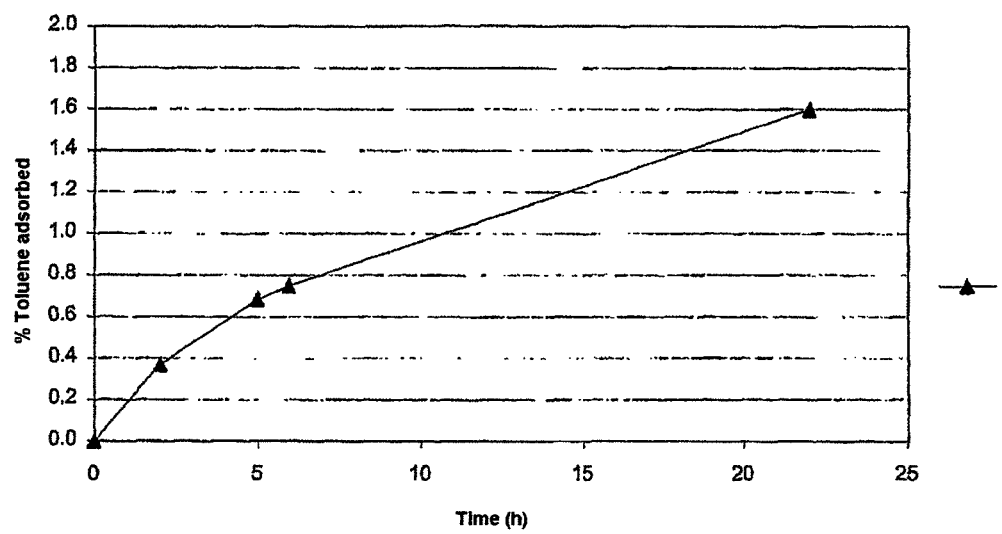
FIG. 9 is a graphical representation of the adsorption results with regard to molecules of VOC type.

The results are presented in FIG. 9. It is found that the zeolitic adsorbents of the invention are also effective in adsorbing molecules of VOC type.

What is claimed is:

1. A zeolitic adsorbent material in the form of solids comprising an organic binder, comprising:
    a) a polymer matrix, wherein the polymer matrix comprises ethylene/butyl acrylate copolymer, and
    b) an amount of zeolite crystals of type 3A homogenously distributed throughout the polymer matrix, said amount of zeolite crystals is between 70-99% by weight, with respect to the total weight of the zeolitic adsorbent material,
    wherein the zeolitic adsorbent material has a single porosity, which is the intrinsic porosity of zeolites homogenously distributed throughout the polymer matrix.

2. The material as claimed in claim 1, wherein the polymer matrix comprises an amount by weight of greater than 20% of ethylene/butyl acrylate copolymer, with respect to the total weight of the polymer matrix.

3. The material as claimed in claim 1, wherein the polymer matrix further comprises a polyamide; a polyester; or a blend of two or more of these polymers.

4. The material as claimed in claim 1, wherein the polymer matrix is capable of forming a supramolecular assembly.

5. The material as claimed in claim 1, wherein the zeolite crystals are natural, synthetic, or artificial zeolites having a mean particle size which is less than 20 μm and is greater than 0.05 μm.

6. The material as claimed in claim 1, and further comprising one or more additives selected from the group consisting of UV stabilizers, pigments, dyes, antioxidants, impact modifiers, phase changing materials (PCMs), flame retardants, odorous agents, and compounds capable of changing color according to the degree of adsorption of the zeolite.

7. The material as claimed in claim 1, wherein the amount of zeolite crystals is less than 95% by weight with respect to the total weight of said zeolitic adsorbent material.

8. The material as claimed in claim 1, wherein the amount of zeolite crystals is less than 90% by weight with respect to the total weight of said zeolitic adsorbent material.

9. The material as claimed in claim 1, wherein the amount of zeolite crystals is less than or equal to 85% by weight with respect to the total weight of said adsorbent material.

10. The material as claimed in claim 1, wherein the polymer matrix comprises an amount by weight of greater than 50% of ethylene/butyl acrylate copolymer, with respect to the total weight of the polymer matrix.

11. The material as claimed in claim 5, wherein the mean particle size is less than 15 μM.

12. The material as claimed in claim 5, wherein the mean particle size is greater than 0.1 μm.

13. A method of adsorbing and/or releasing a substance selected from the group consisting of liquids, gases, water, oxygen, carbon dioxide gas, nitrogen, volatile organic compounds (VOCs), monomers, odorous molecules, and contaminants, which comprises contacting the adsorbent material according to claim 1 with the substance.

14. The method of claim 13, wherein the adsorbent material is used as moisture-adsorbing component in a fixed housed part.

* * * * *